May 4, 1965
T. R. THOMSEN
3,182,264
SEQUENCE TIMER
Filed Aug. 14, 1961
3 Sheets-Sheet 1
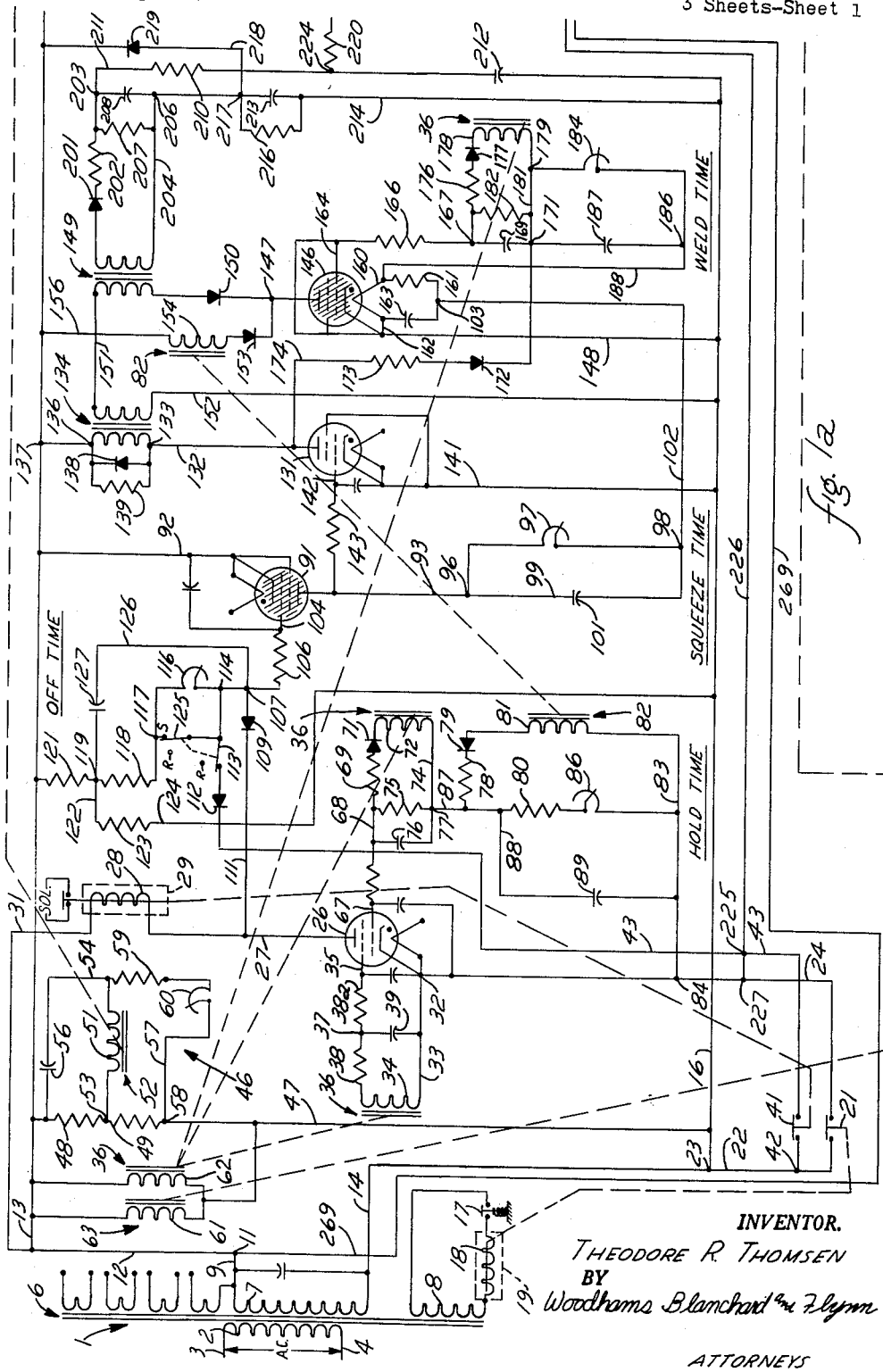
INVENTOR.
THEODORE R. THOMSEN
BY
Woodhams, Blanchard and Flynn
ATTORNEYS

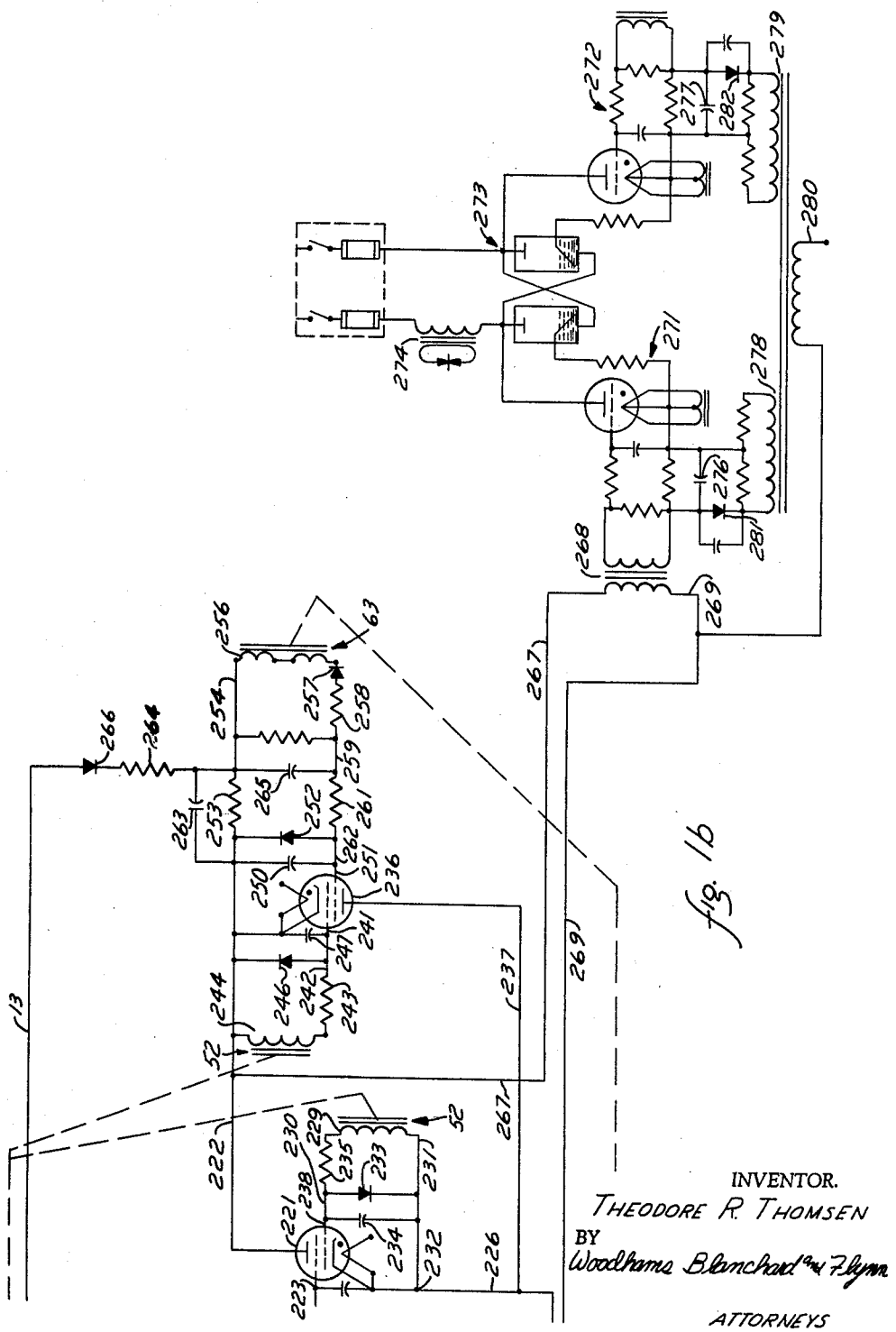

May 4, 1965     T. R. THOMSEN     3,182,264
SEQUENCE TIMER
Filed Aug. 14, 1961     3 Sheets-Sheet 3
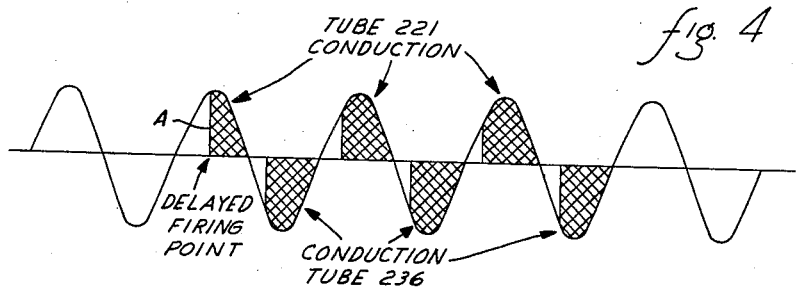
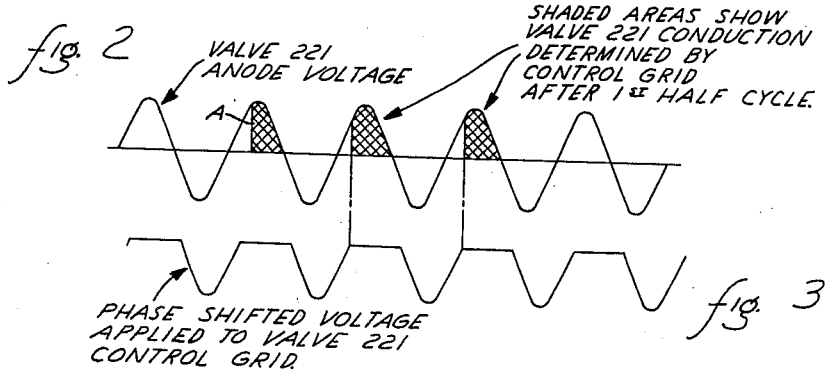
INVENTOR.
THEODORE R. THOMSEN
BY
Woodhams Blanchard and Flynn
ATTORNEYS

United States Patent Office 3,182,264
Patented May 4, 1965

3,182,264
SEQUENCE TIMER
Theodore R. Thomsen, Farmington, Mich., assignor to Robotron Corporation, Detroit, Mich., a corporation of Michigan
Filed Aug. 14, 1961, Ser. No. 131,404
10 Claims. (Cl. 328—75)

This invention relates to a sequence timer and particularly to one of the type utilized for controlling resistance welding machines, and having the usual "squeeze," "weld," "hold" and "off" functions for same.

While a very large number of circuits for sequence timers of the type aforesaid have been presented to the industry, there has been a continuing demand for progressively higher reliability, better accuracy in maintenance of predetermined time intervals, reduction in number of electric discharge tubes utilized therein and simplicity of design, together with fail-safe and other features which have come to be recognized as desirable for such equipment.

While previous sequence timers known to the industry have had one or more of the foregoing particularly named features as well as others incorporated therein, the present invention is the result of a great deal of continuing effort directed toward the improvement of such sequence timers and the incorporation of the foregoing particularly named features as well as other advantageous features to a much higher degree than it has previously been considered possible.

Accordingly, the objects of the invention are:

(1) To provide a sequence timer particularly adapted for controlling resistance welding machines which will have a high degree of accuracy in maintaining its timing intervals within very close tolerances.

(2) To provide a sequence timer which will have a high degree of stability and reliability.

(3) To provide a sequence timer, as aforesaid, which will require a minimum of maintenance time and parts.

(4) To provide a sequence timer, as aforesaid, which will have a minimum of tubes utilized therein and which is arranged with a plurality of fail-safe features, particularly including such an arrangement that regardless of which tube may burn out at a given time it will be impossible for the welder to remain in its current-on condition.

Other objects and purposes of the invention will become apparent to persons acquainted with devices of this general type upon reading the following disclosure and inspection of the accompanying drawings.

In the drawings:

FIGURE 1 (comprising parts 1a and 1b) shows a schematic circuit diagram of a timer embodying the invention.

FIGURE 2 shows the current flow pattern through one of the trigger tubes.

FIGURE 3 shows the grid voltage at one of the trigger tubes.

FIGURE 4 shows the current flow pattern through both trigger tubes.

DESCRIPTION

Hereinafter for convenience in reference, the terms "valve" or "tube" will both be understood to mean any electrical discharge device such as the common thyratron, of the type having an anode, a cathode and one or more control electrodes and wherein upon the establishment of current flow therethrough such flow will continue for as long as the anode potential is above a predetermined minimum regardless of the subsequent potential appearing on the control electrode.

Referring now to the drawings, there is shown in FIGURE 1 a transformer 1 having a primary winding 2 connected to supply conductors 3 and 4 which are in turn connected to any suitable source of potential, such as a common 230 volt A.C. source. Said transformer 1 has a plurality of secondary windings 6 which are connected by conventional means not further shown or described hereinafter to the filaments of the several tubes in the timing circuit. A secondary winding 7 supplies potential to the sequence timing circuit and a secondary winding 8 supplies potential to the starting circuit.

One end of the secondary winding 7 is connected through a conductor 9 to a junction point 11 which is connected through a conductor 12 to a first bus conductor 13. The other end of said secondary winding 7 is connected through a conductor 14 to the second bus conductor 16. One end of the secondary winding 8 is connected through a starting switch 17 to one end of the winding 18 of the relay 19 whose other end is connected to the other end of the secondary winding 8.

The contacts 21 of said relay 19 are connected at their one end through a conductor 22 to a junction point 23 on the conductor 14. The other end of said contacts 21 are connected through a conductor 24 to the cathode of the initiating tube 26 whose anode is connected by conductor 27 through the winding 28 of the solenoid relay 29 to a conductor 31 which is connected to the conductor 12. A junction point 32 on the conductor 24 is connected by conductor 33 to the secondary winding 34 of a transformer 36 whose other end is connected through a resistor 38 to a junction point 37 and thence through a resistor 38a to the second control electrode 35 of the first valve 26. A capacitor 39 is connected from the junction 37 to conductor 33.

The contacts 41 of the solenoid relay 29 are connected between a junction point 42 on the conductor 22 and a conductor 43. A junction point 225 on conductor 43 is connected to a junction point 227 on the line 24.

The phase-shift portion of the heat control circuitry is indicated generally at 46. It comprises a voltage divider conductor 47 connected between the bus conductors 13 and 16 and including resistances 48 and 49 which in this embodiment are of substantially equal value. The primary winding 51 of the heat control transformer 52 is connected at its one end to a junction point 53 located between said two last-named resistances and is connected at its other end through a conductor 54 to one side of a capacitor 56 whose other side is connected to the potential of the bus conductor 13. A conductor 57 is connected from a junction point 58, which is connected by line 47 to the potential of the bus conductor 16, through a first variable resistance 60 and then a fixed resistance 59 to the conductor 54.

The primary windings 61 and 62 of the transformers 63 and 36, respectively, are connected in parallel between the bus conductor 13 and the potential of the bus conductor 16.

The "hold time" function is performed by circuitry which operates on the first control electrode 67 of the first valve 26. Said first control electrode is connected by a conductor 68 to one end of a resistance 69 whose other end is connected to one side of a rectifier 71. The other side of said rectifier is connected to one end of a secondary winding 72 of the transformer 36 and the other end of said secondary winding is connected by a conductor 74 through a resistor 75 and a capacitor 76 to the conductor 68. A junction point 77 on the conductor 74 is connected through a resistance 78 to one side of the rectifier 79 whose other side is connected to one end of a secondary winding 81 of a transformer 82 and the other end of said last-named secondary winding is connected by a conductor 83 to a junction point 84 on the conductor 24. The conductor 83 is connected through a variable resistance, such as a rheostat 86, and through a fixed resistance 80 to the conductor 87. Said conductor 87 is connected by a conductor 88 through a capacitor 89 to the conductor 83.

A second valve 91 has its cathode connected by a conductor 92 to the first bus conductor 13 and its anode connected by a conductor 93 to the "squeeze time" circuit. Said squeeze time circuit consists of a connection from the junction point 96 on the conductor 93 through a variable resistor 97 to junction point 98. Said junction point 96 is also connected through a conductor 99 to one side of a capacitor 101 whose other side is also connected to the junction point 98. Said junction point 98 is then connected by conductor 102 to a junction point 103 whose subsequent connections are further discussed hereinafter.

Returning to the second valve 91, the control electrode 104 thereof is connected through a protective resistance 106 to the junction point 107 in the "off time" control circuit. Said junction point 107 is connected to the anode side of a rectifier 109 whose cathode side is connected through a conductor 111 to the conductor 27 associated with the anode of the first valvet 26. The conductor 43 above mentioned is connected to the cathode side of the rectifier 112 whose anode side is connected through contacts 113 of the "repeat-single" switch to a junction point 114 which is connected to the junction point 107. Said junction point 114 is then connected through a variable resistor 116 to a junction point 117 whose purpose will appear hereinafter and thence through a resistor 118 to a junction point 119 in a voltage divider consisting of the resistances 121 and 123, said voltage divider being connected at its one end to line 13 and at its other end by the line 124 to the second bus conductor 16. A second set of contacts 125 of the repeat-single switch, are connected around the variable resistance 116. A conductor 126 connects the junction point 107 through the capacitor 127 and thence to the junction point 119.

The third valve 131 has its anode connected by a conductor 132 to a junction point 133. Said junction point is then connected through the primary winding of the transformer 134 to a junction point 136 which in turn is connected to a junction point 137 on the first bus conductor 13. The junction point 133 is also connected to the anode of a rectifier 138 whose cathode is also connected to the junction point 136. The resistance 139 is connected in parallel around the rectifier 138. The cathode of the third valve 131 is connected by a conductor 141 to the second bus conductor 16. The control electrode 142 of said valve 131 is connected through a protective resistance 143 to the conductor 93.

A fourth valve 146 has its anode connected to a junction point 147 and its cathode connected through the conductor 148 to the second bus conductor 16. The junction point 147 is connected to the cathode side of the rectifier 150 whose anode side is connected to one end of the primary winding of a transformer 149 whose other end is connected by a conductor 151 to one end of the secondary winding of the transformer 134. The other end of said last-named secondary winding is connected by a conductor 152 to the second bus conductor 16.

The junction point 147 is also connected to the cathode end of a rectifier 153 whose anode end is connected to one end of the primary winding 154 of the transformer 82. The other end of said primary winding 154 is connected by a conductor 156 to the first bus conductor 13.

The junction point 103 is connected through a resistance 161 to the one end of the filament 160 of the fourth valve 146, the other end of said filament being connected by a conductor 162 to a junction point on the conductor 148. Said other end of said filament is also connected through a capacitor 163 back to the junction point 103.

The control electrode 164 of said fourth valve 146 is connected through a protective resistance 166 to a junction point 167 in the "weld time" circuit. Said junction point 167 is connected to one side of a capacitor 169 whose other end is connected to a junction point 171. Said junction point 171 is connected to the cathode end of a rectifier 172 and the anode end thereof is connected through a suitable resistance 173 through a conductor 174 to a suitable junction point on the line 132. The junction point 167 is also connected through a suitable resistance 176 to the anode of the rectifier 177 whose cathode is connected to one end of a further secondary winding of the transformer 36. The other end of said secondary winding is connected to a junction point 179, said junction point being connected by the conductor 181 to the junction point 171. A resistance 182 of high value, as 200,000 ohms, is connected in parallel around the capacitor 169 and between the junction points 167 and 171.

Returning now to the junction point 179, the same is connected through a variable resistance 184 to a junction joint 186. Said last-named junction point is then connected through a capacitor 187 to the junction point 171 and is also connected by a conductor 188 to the above-mentioned filament 160 of the fourth valve 146.

Returning now to the transformer 149, one end of its secondary winding is connected to the anode side of a rectifier 201 whose cathode side is connected through a resistance 202 to a junction point 203. The other end of said secondary winding is connected through a conductor 204 to a junction point 206. A resistance 207 and a capacitor 208 are connected in parallel with respect to each other and between the junction point 203 and the junction point 206. The junction point 203 is then connected by a conductor 211 through a resistance 210 and a capacitor 212 to the second bus conductor 16. The junction point 206 is connected through a capacitor 213 by a conductor 214 to the second bus conductor 16. The resistor 216 is connected in parallel with the capacitor 213. A junction point 217 located between said capacitor 213 and the junction point 206 is connected by a conductor 218 to the anode of a rectifier 219 whose cathode is connected to the first bus conductor 13.

A fifth valve 221 (FIGURE 1b) (which may be termed a trigger valve for convenience in reference) has its anode connected to a common conductor 222 whose function will appear further hereinafter, its second control electrode 223 connected through a resistor 220 to a junction point 224 on the line 211 and its cathode connected by a conductor 226 to the junction point 227. A first control electrode 228 of the valve 221 is connected through a resistor 235 to one end of a first secondary winding of the transformer 52 whose other end is connected by a line 231 to a junction point 232 on the conductor 226. A rectifier 233 has its anode connected to the conductor 230 and its cathode connected to the conductor 231. A capacitor 234 is also connected between the conductor 230 and the conductor 231.

A sixth valve 236 (which may also be termed a trigger valve for convenience in reference) has its anode connected by a conductor 237 to the line 226 and its cathode connected to the line 222. A first control electrode 241 of the valve 236 is connected by a line 242 through a resistance 243 of high value to one end of a second secondary winding 244 of the transformer 52, the other end of which secondary winding is connected to the line 222. The rectifier 246 has its anode connected to the line 242 and its cathode connected to the line 222. The capacitor 247 is also connected between the line 242 and the line 222. The second control electrode 251 is connected to the anode side of a rectifier 252 whose cathode is connected to the line 222. A capacitor 250 is connected in parallel with rectifier 252. Said line 222 is connected to one end of the resistance 253 and the other end of said resistance 253 is connected by a conductor 254 to one end of the secondary winding 256 of the transformer 63. The other end of said last-named secondary winding is connected to the cathode of the rectifier 257 whose anode is connected through a relatively small resistance 258 and thence by a conductor 259 to one end of a relatively high resistance 261. The other end of said resistance 261 is connected by the conductor 262 to the second control electrode 251. A capacitor 265 is connected between the conductor 259 and the conductor 254. Another capacitor 263 is connected in parallel around the resistance 253. The conductor 254 is connected through a resistance 264 to the cathode of the rectifier 266 whose anode is connected to the first bus conductor 13.

An output conductor 267 connects the conductor 222 with one end of the primary winding of the firing transformer 268 whose other end is connected by a conductor 269 to the junction point 11. The secondary windings of the firing transformer 268 connect through the usual firing circuits 271 and 272 to suitable welding current valves, here ignitrons 273, for supplying the primary winding of the welding transformer 274 in the usual manner.

OPERATION

The operation of the foregoing described circuit, utilized to illustrate the invention, being somewhat different from the presently common timing circuit in which the valves are arranged in cascade relationship with respect to each other, attention will now be directed in detail to the operation of such circuit in order to insure a clear understanding thereof.

The "at rest" condition

In the "at rest" condition, the valves are conductive or nonconductive as indicated in the drawing, namely, all valves except valves 91 and 146 are nonconductive and valves 91 and 146 are conductive.

A potential is applied at the A.C. source and is suitably supplied to all of the valve filaments by means including the secondary windings 6 and other conventional means not shown. Energization of the primary winding of the transformer 1 also energizes the secondary winding 7 and thereby applies an alternating potential to the first and second bus conductors 13 and 16.

With the initiating pilot switch 17 open, the winding of relay 19 is de-energized so that the contacts 21 thereof are open. With such contacts open, there is no potential applied from the secondary winding 7 of the transformer 1 to the cathode of the first valve 26 and hence said valve is nonconductive. With the tube 26 nonconductive, the winding 28 of relay 29 will be de-energized so that the solenoid valve controlling the pressure fluid to the welding electrodes will be de-energized and closed. Simultaneously, with the tube 26 nonconductive, there will be no potential applied to the control electrode 104 of the second tube 91 and hence said second tube will be conductive. With the tube 91 conductive, potential will be applied from the bus conductors 13 and 16 onto the capacitor 101 for charging same, the charging path being from the second bus conductor 16 through conductor 148 and through the filament 160 of the fourth tube 146 and said resistance 161 to and through the conductor 102 to the junction point 98 and thence through the resistance 97 to the junction point 96, the capacitor 101 being also connected between the junction points 98 and 96, thence through the second tube 91 to the first bus conductor 13.

With anode potential on the second tube 91, a blocking potential is applied to the control electrode 142 of the third tube 131 and hence said third tube is held nonconductive.

With the third tube 131 nonconductive, potential is supplied through the conductor 174 to the weld time system and hence a positive potential is supplied to the control electrode 164 of the fourth tube 146. Accordingly, said fourth tube is conductive and a conductive path is provided from the first bus conductor 13 through the primary winding 154 of the transformer 82, thence through the rectifier 153 to and through the said fourth tube 146 and thence by the conductor 148 to the second bus conductor 16. However, even though the fourth tube 146 is conductive, conduction cannot occur through the transformer 149 inasmuch as the transformer 134, which acts as a supply for the transformer 149, is at this time not energized.

With the transformer 82 energized, its secondary winding 81 (in the "hold time" circuit) is energized which acts through the rectifier 79 and the resistor 78 to create a potential drop across resistor 80 and variable resistor 86 to charge the capacitor 89. This will apply a positive bias onto the control electrode 67 of the first tube 26 which overcomes the negative bias which appears constantly on the capacitor 76 as a result of the action of the transformer 36 acting continuously through the rectifier 71. Thus, insofar as the control electrode 67 is concerned, the first tube 26 would be conductive but inasmuch as the cathode circuit is open at the contact 21 of the relay 19, as above mentioned, said tube remains nonconductive. At the same time, the potential between the bus conductors 13 and 16 is rectified by the rectifier 219 and appears as a negative potential and develops a potential across the capacitor 213 which appears as a negative potential at the junction point 217. This negative potential is applied through junction point 206, the resistance 207, the junction point 203, the resistance 210 to the junction point 224 and thence as a negative bias on shield grid 223 of the fifth valve 221. Thus, conduction of said valve is prevented. At the same time the constantly energized transformer 63 energizes secondary winding 256 (to the right of sixth valve 236) which acts through the rectifier 257 to place a constant potential on the capacitor 265, the negative side of which is applied to the shield grid 251 to hold the sixth valve 236 nonconductive.

Likewise the firing tubes in the firing circuits 271 and 272 are held nonconductive by a negative potential applied to their respective control electrodes from the capacitors 276 and 277, respectively, which are each charged from the secondary windings 278 and 279 through the rectifiers 281 and 282, respectively. The primary winding 280 energizing the secondary windings 278 and 279 is itself energized in any convenient manner according to conventional practice.

Single operation—Start and "squeeze time"

Assuming first that the "single-repeat" switch whose contacts are indicated at 113 and 125 is set in the "single" position with said contacts as shown, the sequence is initiated by depressing the pilot switch 17. This energizes the winding 18 of the relay 19 which closes the contacts 21. This provides the connection from the junction point 23 on the second bus conductor 16 to the cathode of the first tube 26 and hence renders said tube conductive and energizes the winding 28 of the relay 29. This energizes the solenoid valve to start closing of the welding electrodes. Energizing of relay 29 also closes the contacts 41 of said relay which locks in relay 29 and the "squeeze time" cycle is started. The circuitry including the secondary winding 34 of the transformer 36, the resistance 38 and capacitor 39 constitute a phase-shift circuit placing a blocking potential onto the control electrode 35 of said tube 26 at a point shortly after the commencement of a given pulse appearing at the source. This will block the tube 26 at a predetermined, and usually relatively short, time after the beginning of said pulse. Thus, if the apparatus is not rendered conductive within such predetermined time following the beginning of a given pulse, it will be prevented by the energizing of the control electrode 35 from starting until the beginning of the next pulse. This improves the stability of the apparatus and its reliability with respect to the amount of heat generated at a weld by insuring the commencement of a time cycle only at a point at or near the beginning of a source pulse.

Closing of the contacts 41 also imposes a potential through the conductor 43 to the rectifier 112, thence through the closed switch contacts 125 and 113, and through resistors 118 and 121 to the first bus conductor 13. This charges the capacitor 127 and thereby applies a negative voltage onto the control electrode 104 of the second tube 91 resulting in an immediate blocking of said tube. With the tube 91 blocked, the capacitor 101 ceases charging and commences discharging through the rheostat 97, the adjustment of which determines the time required for discharging of said last-named capacitor to a predetermined low value. This will determine the "squeeze time."

When the potential on the capacitor 101 has diminished to a value close to that of the second bus conductor 16, the third valve 131 will be rendered conductive and conduction thereof will energize the transformer 134. Energization of the transformer 134 will energize the primary winding of the transformer 149 whose circuit is completed through the then conductive fourth tube 146.

Conduction of the third tube 131 brings the potential of its anode close to that of the second bus conductor 16 and this removes the potential through the rectifier 172 and accordingly terminates the charging of the "weld time" capacitor 187. This capacitor now starts discharging through the rheostat 184 at a rate determined by the setting thereof. This ends the "squeeze time" and starts the "weld time."

"Weld time" sequence

With the energization of the transformer 149 as above mentioned, the voltage which appears in the secondary winding thereof is rectified by the rectifier 201 and charges the capacitor 208. This creates a positive voltage at the junction point 203 which is applied by the conductor 211 to the control electrode 223 of the fifth tube 221, overcoming the negative voltage also applied as above set forth to the control electrode and thus rendering said fifth tube conductive. By proper adjustment of the values of the resistor 210 and of the capacitor 212, the potential can be caused to rise in the control electrode 223 at a predetermined rate to determine the point on the supply wave at which the fifth valve 221 conducts on the first half cycle. As will be seen subsequently, the point at which the fifth valve 221 conducts determines the point of firing of the firing circuits 271 and 272. Thus, it will be recognized that suitable calibration of the resistance 210 will determine the point on the wave of the first half cycle at which weld time will commence.

Conduction of said valve 221 provides a path from the secondary winding 7 of the transformer 1 by way of the junction point 11, conductor 269, the primary winding of the firing transformer 268, conductor 267, valve 221, conductor 226 back to said secondary winding 7. Thus the conduction of valve 221 energizes the firing transformer 268. This in a known manner overcomes the negative bias applied by the capacitors 276 and 277 to the firing tubes of the firing circuits 271 and 272 and thereby renders the ignitrons 273 conductive and commences the flow of welding current.

Conduction of the fifth tube 221 also provides a conductive path from the first bus conductor 13 through the rectifier 266 and then through the resistors 264 and 253, the conductor 222, the valve 221, the conductor 226 to the junction point 23 on the second bus conductor 16. The potential difference thereby created across the resistor 253 effects the charging of the capacitor 263. This creates a positive potential applicable to the shield electrode 251 of the sixth valve 236 which overcomes the negative potential normally applied thereto as above described from and by the capacitor 265 and thereby renders the sixth tube 236 conductive. Thus, with the fifth valve 221 providing a conductive path through the firing transformer 268 on one half cycle, the sixth valve 236 will provide a conductive path for the primary winding of said transformer 268 on the other half cycle. This is illustrated by FIGURE 4.

The point at which the first cycle of conduction commences, indicated by the line A in each of FIGURES 2 and 4, is as above mentioned determined by the relative magnitudes of the resistance 210 and the capacitance 212. The point on the supply waves at which subsequent conduction commences is determined by the setting of the potentiometer 60 (in the heat control circuit) which affects the phase-shift circuit including the primary winding of transformer 52 whose secondary windings 229 and 244 control the fifth and sixth valves 221 and 236, respectively. Looking first at the fifth tube 221, this circuitry applies a phase-shifted negative voltage to the control grid 238 and thereby prevents conduction of the fifth tube 221 regardless of what happens at the shield grid 223, the potential at the control grid 238 from the rectifier 233 (when not phase-shifted) being negative when the potential from the rectifier 201 at the shield grid 223 is positive. Therefore, the circuit energizing the control grid 238 prevents conduction of the fifth valve 221 until a predetermined point in the half-cycle supplied thereto following the positive swing of the shield grid 223.

Corresponding control is applied through the secondary winding 244 of the transformer 52 to the control grid 241 of the sixth valve 236 as compared to the voltage applied to the shield grid 251.

For further illustration, the phase-shifted voltage applied to the control grid 238 of the fifth valve 221 appears in FIGURE 3 and is placed in alignment with the illustration in FIGURE 2 of the conductivity of the fifth tube 221. FIGURE 4 illustrates the conductivity of both of valves 221 and 236 and thereby illustrates the voltage applied to the transformer 268 for effecting a weld.

The rectifier 252 acts as a clipper for preventing the shield grid 251 from becoming positive and thereby preventing spurious conduction of the sixth tube 236. No corresponding protective means is provided for the fifth valve 221 inasmuch as other means including the resistances 202 and 207 provide sufficient protection for said fifth tube 221.

The "weld time" is thus initiated and continues for so long as the charge in weld time capacitor 187 remains above a predetermined level. However, when such charge has drained out through the variable resistance 184, and for a period of time determined by the setting of such variable resistance, and reaches a predetermined minimum, then it can no longer override the negative voltage appearing on the control electrode 164 of the fourth valve 146 and originating at the rectifier 177. When this happens the conduction of the fourth valve 146 will stop which will de-energize both the transformer 82 and the transformer 149. With the de-energizing of the transformer 149, the charging of the capacitor 208 will cease and will instead discharge through the resistance 207. When the capacitor 208 has discharged, it will no longer apply the positive voltage to the shield electrode 223 of the fifth valve 221 and the conduction of the valve will accordingly stop. The capacitor 208 is calibrated with respect to the resistance 207 so that it maintains the fifth valve 221 conductive for a predetermined period of time, such as a little less than one cycle, after the fourth valve 146 stops conducting. The conductivity of the fifth valve 221 for such additional period of time insures the charging of the capacitor 263 and hence the conductivity of the sixth valve 236 for the corresponding half cycle. However, by the time the sixth valve 236 ceases to conduct the capacitor 208 will have discharged sufficiently that there is no possibility of the fifth valve 221 again conducting and hence adequate provision is made against more than one additional cycle of conduction following the de-energization of the fourth valve 146 and yet equally careful provision is made that the "weld time" will terminate in all cases with the same half cycle, namely, that represented by the conduction of the sixth valve 236. Thus, in this embodiment, the "weld time" equals the period during which the fourth tube 146 remains conductive plus one cycle. With both of valves 221 and 236 nonconductive, the firing transformer 268 is de-energized and the firing circuits 271 and 272, and the weld current valves 273, are all de-energized and the weld current stops. This ends the "weld time" sequence and starts the "hold time" sequence.

"Hold time" sequence

With the nonconduction of the fourth valve 146, and de-energizing of the transformer 82 as above mentioned, the secondary winding 81 thereof is also de-energized and the charging of the capacitor 89 in the "hold time" circuit stops. Said capacitor now starts discharging through the variable resistor 86 and the rate of such discharging is determined by the setting of said variable resistor. When the potential of said capacitor has diminished to a predetermined point, namely, such that it can no longer override the negative potential applied to the control electrode 67 from and by the rectifier 71, then the first valve 26 will again be blocked by the negative potential supplied by said rectifier 71 and said first valve will cease to conduct. This de-energizes the relay 29 and the contacts 41 thereof, thereby de-energizing the solenoid valve and permitting the welding electrodes to open. Opening of contacts 41 permits the relay 19 to become de-energized and the contacts 21 associated with it are opened. The apparatus thus returns to the initial "at rest" condition as above described. This completes the "hold time" cycle.

So long as the pilot switch 17 remains closed, a potential will be supplied through junction points 227 and 225 to the rectifier 112 and from said rectifier to the control electrode 104 of the second valve 91. This will hold said second valve nonconductive and thereby prevent further, or repeat, operation of the apparatus for so long as the first pilot switch 17 remains closed.

Repeat operation

For a repeat operation the switches 113 and 125 are moved to their "R" position and the pilot switch 17 again closed. The starting and sequencing of the apparatus is the same as above described for single operation through the "squeeze," "weld" and "hold" functions, excepting only that with the said switches 113 and 125 now open, energizing of the line 43 will have no effect upon the electrode 104 of the second valve 91 and energizing of the line 111 will now effect charging of the capacitor 127 and at the same time supply a blocking potential to the electrode 104.

"Off time" sequence

When the first valve 26 becomes nonconductive at the end of the "hold time," this returns the potential of the line 111 to substantially that of the first bus conductor 13 and thereby terminates the charging of the capacitor 127. This capacitor 127 now starts to discharge through the variable resistance 116 whose setting determines the rate of such discharge and thereby determines the "off time." When the potential of said capacitor has diminished to a predetermined value, the blocking voltage on the control electrode 104 of the second valve 91 is removed and said valve 91 resumes conduction. This again charges the "squeeze time" capacitor 101 and when said capacitor is charged to a predetermined value, a blocking voltage appears at the control electrode 142 of the third valve 131 and said third valve then ceases to conduct. This permits the potential of the line 174 again to move toward a value approximating that of the first bus conductor 13 and a charging potential, subject to the effect of the rectifier 172, is again applied to the "weld time" capacitor 187. As said capacitor 187 charges the positive potential developed thereby on the control electrode 164 of the fourth valve 146 will overcome the negative potential applied thereto by the rectifier 177 and said fourth valve 146 will resume conduction. Such conduction will energize transformer 82 but will not energize transformer 149 inasmuch as the source for transformer 149, namely, transformer 134 is still de-energized. Therefore, no charging voltage is applied to the capacitor 208 and the valves 221 and 236 will remain as above described in their "at rest" condition.

With the energizing of the transformer 82, the secondary winding 81 thereof will be energized and this acts through the rectifier 79 to charge the capacitor 89 in a positive direction such that the potential on the capacitor 89 will then be applied as a positive potential onto the control electrode 67 and overcome the negative potential applied thereto from and by the rectifier 71. Since all of this will occur substantially instantaneously following the conduction of the second tube 91, plus only the time required to charge the capacitor 89, the first tube 26 will be rendered conductive substantially upon the discharging of the "off time" capacitor 127 to such a level as to permit conduction of the second valve 91. Thus the time required for such discharging of the "off time" capacitor 127 will constitute the "off time" of the cycle.

Upon the valve 26 again being rendered conductive, the new cycle will start and will continue to repeat for so long as the initiation switch 17 is held closed.

Opening of the initiating switch 17 will have no effect upon the continuation of a cycle already started and such a cycle will continue to its end. However the opening of the switch 17 will open the contacts 21 and thereby remove cathode potential from the first valve 26 at the completion of a given cycle. Thus said valve is nonconductive and the apparatus will at the completion of such cycle resume its "at rest" condition above described.

Accordingly, there is provided and herein described a circuit meeting the objects and purposes above set forth and particularly providing the high degree of accuracy and fail-safe characteristics.

Although a particular embodiment of the invention has been described above in detail for illustrative purposes, it will be recognized that variations or modifications of such disclosure, which lie within the scope of the appended claims, are fully contemplated.

What is claimed is:

1. In a sequence timing circuit, especially for a welding service involving "squeeze," "weld," "hold" and "off" time functions, the combination comprising:
   first and second bus conductors and means energizing same with an alternating potential;
   a first valve having an anode, a cathode and a control electrode;
   a first load and means connecting the anode of said first valve through said load to said first bus conductor and other means connecting the cathode of said first valve to said second bus conductor;
   a source of constant blocking potential and means applying same to said control electrode;
   a first chargeable device and means applying a positive potential therefrom, when same is charged, to said control electrode whereby to negate said blocking potential and render said first valve conductive;
   resistive means providing a discharge path for said first chargeable device;
   sequencing means including a switch initiated by conduction of said first valve;
   a second valve;
   charging means having terminals and means effecting a potential drop between said terminals;
   means connecting the anode of said second valve to one of said terminals;
   means connecting the other of said terminals to said first bus conductor, means connecting the cathode of said second valve to said second bus conductor, potential means imposing the potential difference between said terminals as a unidirectional potential to said first chargeable device at such polarity as to apply a positive potential to the control electrode of said first valve;
   continuously energized constant potential means oriented for holding said second valve nonconductive;

a second chargeable device connected for opposing the potential of said last-named means;

means activated when said switch is open for charging said second chargeable device whereby nonconduction of said switch will effect conduction of said second valve and thereby the creation of a potential difference between said terminals and conduction of said first valve.

2. The device defined in claim 1 including a trigger valve;

continuously energized means normally holding said trigger valve nonconductive;

and signal means responsive to the simultaneous closing of said switch and conduction of said second valve for overcoming the continuously energized blocking means associated with said trigger valve and rendering same conductive;

a second load and a firing circuit which when energized energizes said second load;

means energizable when said trigger valve is conductive for energizing said firing circuit.

3. The device defined in claim 2 including a resistance and a capacitor in series with respect to each other in the circuit of said signal means, means connecting a point intermediate said resistance and said capacitor to a control electrode of said trigger valve whereby the rate of potential build-up on said control electrode in response to a signal on said signal means may be determined by the relative values of said resistance and said capacitor.

4. The device defined in claim 1 wherein said charging means is a transformer having its primary winding connecting said terminals and its secondary winding connected on opposite sides of said first chargeable device.

5. The device defined in claim 1 including a pair of trigger valves connected in parallel with each other and in opposite polarity;

continuously energized phase-shiftable means for applying a blocking potential to each of said trigger valves;

signal means responsive to the conduction of both the first and second of said valves together with the closing of said switch for applying a potential overcoming that one of said continuously energized means blocking the first of said trigger valves and thereby rendering same conductive;

circuitry responsive to the conduction of the first of said valves for applying a potential overcoming that blocking potential applied to the second of said trigger valves for rendering and holding same conductive for a period of time following the termination of conduction of said first valve equal to at least one half cycle of the alternating source;

a second load and a firing circuit which when energized energizes said second load;

means energizable as each of said trigger valves is rendered conductive for energizing said firing circuit, said phase-shiftable means determining the total energy delivered to said second load.

6. In a sequence timing circuit, especially for welding service involving "squeeze," "weld," "hold" and "off" time functions, the combination comprising:

first and second bus conductors and means energizing same with an alternating potential;

a first valve having an anode, a cathode and a control electrode;

a load and means connecting the anode of said first valve through said load to said first bus conductor and other means connecting the cathode of said first valve to said second bus conductor;

a source of constant blocking potential and means applying same to said control electrode and a "hold" time capacitor and means applying a positive potential therefrom when same is charged to said control electrode whereby to render said first valve conductive;

resistive means providing a discharge path for said "hold" time capacitor when no charging potential is supplied thereto;

a second valve and means connecting its cathode to said first bus conductor and other means connecting its anode to said second bus conductor;

an "off" time capacitor and a resistance connected in parallel therewith comprising an R.C. circuit;

means connecting a first end of said R.C. circuit to said first bus conductor and other means connecting a second end of said R.C. circuit to the control electrode of said second valve;

means including a unidirectional valve connecting said second end of said R.C. circuit to the anode of said first valve, said unidirectional valve being oriented to apply a voltage of blocking polarity to the control electrode of said second valve;

initiating means including a relay, said relay including a first pair of contacts interposed in the cathode circuit of said first valve;

a second pair of contacts arranged for closing upon energizing of said load;

a second unidirectional valve;

and conductive means including said second pair of contacts and said second unidirectional valve connecting said second bus conductor to said second end of said R.C. circuit;

whereby blocking of said second valve may be effected either as a result of conductivity of said first valve or as a result of closing said initiating means.

7. The device defined in claim 1 wherein said switch is a valve having an anode, a cathode and a control electrode and wherein the anode thereof is connected to said first bus conductor and the cathode is connected to said second bus conductor and the connection therefrom to said second chargeable device is from the anode thereof and includes a unidirectionally conductive valve oriented in such polarity as to apply a positive potential to that side of said second chargeable means which is connected to the control electrode of said second valve.

8. In a sequence timing circuit especially for welding service involving "squeeze," "weld," "hold" and "off" time functions, the combination comprising:

a source of alternating potential;

a first valve including at least an anode, a cathode and a control electrode and means actuable to connect said anode and cathode across said source;

continuously energized first blocking means normally blocking said first valve;

a normally conductive second valve including at least a cathode, a control electrode and having first and second anode circuits for connecting said second valve to said source;

firing circuitry effective when energized for overcoming said first blocking means so that conduction of said first valve is no longer blocked by said first blocking means and means responsive to energization of said first anode circuit for energizing said firing circuit;

a load and a third valve serially connected therewith for energization by said source, said third valve including at least an anode, a cathode and a control electrode;

second blocking means normally holding said third valve nonconductive;

and circuitry responsive to energization of said second anode circuit for acting when energized to overcome said second blocking means an energize said load;

means terminating the conductivity of said second valve in timed relation to commencement of conductivity of said first valve;

whereby when said second valve becomes nonconductive the first valve becomes blocked in a timed relationship therewith.

9. The device defined in claim 8 wherein said second blocking means includes continuously energized pulsating blocking means and continuously energized constant blocking means whereby said circuitry responsive to energization of said second anode circuit acts when energized to overcome said constant potential blocking means and said circuitry, when energized acts at a predetermined point in a cycle of said pulsating blocking means to overcome said pulsating blocking means.

10. In a sequence timing circuit especially for welding service involving "squeeze," "weld," "hold" and "off" time functions, the combination comprising:

a source of alternating potential;

a first valve including at least an anode, a cathode and a control electrode and means actuable to connect said anode and cathode across said source;

continuously energized first blocking means normally blocking said first valve;

a normally conductive second valve including at least a cathode, a control electrode and having first and second anode circuits for connecting said second valve to said source;

firing circuitry effective when energized for overcoming said first blocking means so that conduction of said first valve is no longer blocked by said first blocking means and means responsive to energization of said first anode circuit for energizing said firing circuit;

a load and a third valve serially connected therewith for energization by said source, said third valve including at least an anode, a cathode and a control electrode;

second blocking means normally holding said third valve nonconductive;

and circuitry responsive to energization of said second anode circuit for acting when energized to overcome said second blocking means and energize said load;

normally de-energized means including a switch closeable for supplying voltage to said second anode circuit;

means responsive to the conductivity of said first valve for controlling the energizing of said normally de-energized means and means including said switch for rendering said second valve nonconductive in timed relation to the closing of said switch;

whereby when said second valve becomes nonconductive the first valve becomes blocked in timed relationship therewith.

References Cited by the Examiner
UNITED STATES PATENTS
3,015,067  12/61  Porter _____ 328—73

ARTHUR GAUSS, *Primary Examiner.*

JOHN W. HUCKERT, *Examiner.*